United States Patent Office 3,148,499
Patented Sept. 15, 1964

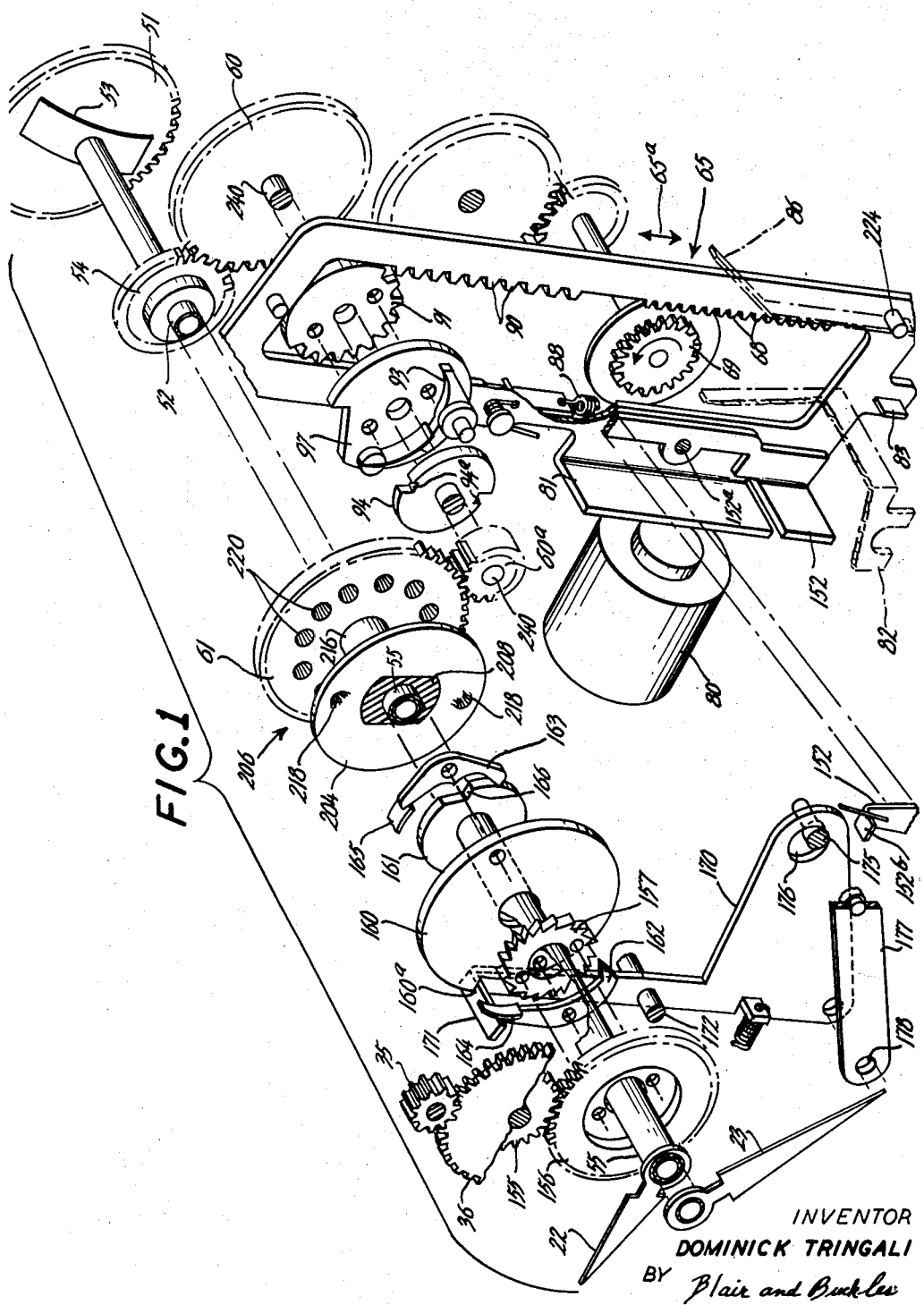

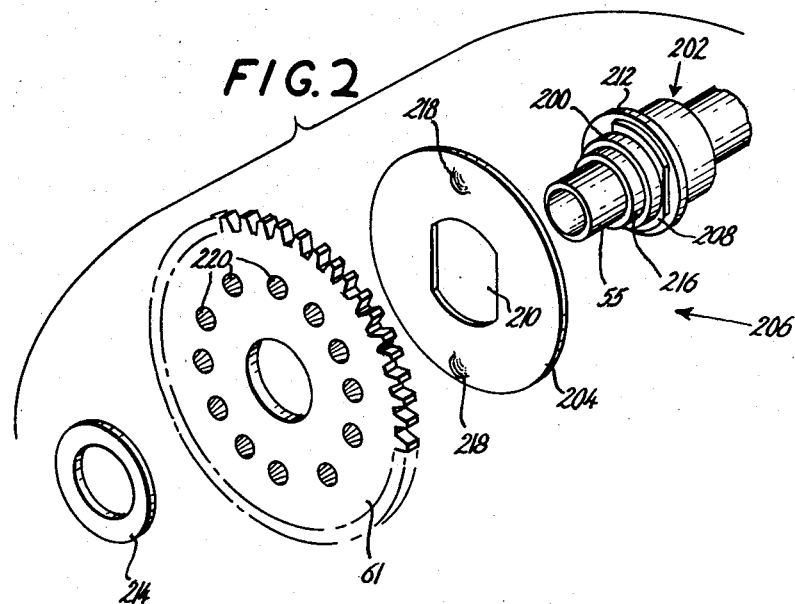
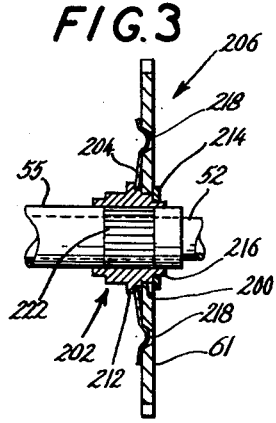
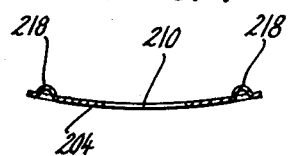

3,148,499
INDEXING CLUTCH ASSEMBLY FOR A SECONDARY CLOCK CORRECTION MECHANISM
Dominick Tringali, Litchfield, Conn., assignor to General Time Corporation, New York, N.Y.
Filed Oct. 23, 1961, Ser. No. 146,790
4 Claims. (Cl. 58—34)

The present invention relates to a novel clutch assembly for maintaining fixed discrete angular relationships between two rotatable members, and in particular relates to such a clutch assembly which has particular utility in a secondary synchronous clock.

There are known in the prior art secondary synchronous clocks which are periodically corrected from a remote master clock, in which the minute hand is corrected hourly and the hour hand is corrected less frequently. A clutch mechanism is provided between the power train and the minute hand in order to permit adjustment of the minute hand to a preselected indexed position on command, and similarly a further clutch is provided between the power train and the hour hand, to permit periodic correction of the position of the hour hand. Such prior art clocks, typified by the Black Patent No. 2,860,481, provide simple bowed leaf spring clutches bearing on the side faces of the driving gears to permit adjustment of the angular relationship between the driving gears and the driven shafts which carry the hands.

In the Black patent referred to above, the position of the minute hand is corrected each hour, while the position of the hour hand is corrected only every twelve hours. The minute hand correction mechanism sometimes shakes or jars the clock every hour, causing slippage of the bowed spring clutch on the hour shaft. This permits the hour shaft to shift its angular position relative to the hour driving gear, causing the hour hand to "drift."

It is an object of the invention to provide a novel clutch assembly which will not slip below a particular torque threshold.

It is a further object of the invention to provide a clutch assembly of the above character which is indexed to maintain discrete angular relationships between the driving and the driven members.

It is a further object of the invention to provide an improved clutch assembly of the above character for the hour hand of a secondary clock, the clutch assembly being indexed at hour intervals.

It is a further object of the invention to provide a clutch assembly of the above character which is simple and economical to manufacture and assemble, yet which is reliable in operation.

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is an exploded fragmentary view of the minute and hour hand drive mechanism for a secondary clock, and includes the remotely operated correction mechanism which positions the clock hands.

FIGURE 2 is an exploded view of the novel clutch subassembly incorporated in the mechanism of FIGURE 1.

FIGURE 3 is a cross section of the assembled clutch subassembly.

FIGURE 4 is a cross section of the spring disc utilized in the indexed clutch subassembly.

Similar reference characters refer to similar parts throughout the several views of the drawings.

The Basic Secondary Synchronous Clock

Referring now to FIGURE 1, there is shown a secondary synchronous clock generally of the type disclosed in the above-noted Black patent. The clock is normally operated by a synchronous motor (not shown), the motor pinion being indicated at 35.

The normal driving train for the minute hand 23 and hour hand 22 includes the motor pinion 35, the minute shaft 52, and surrounding hour sleeve 55, and the gears 36, 51, 54, 60, 60a and 61.

The rectangular rack 65 and associated mechanism shown in the lower right hand corner of FIGURE 1 comprise a periodic correction subassembly for correction of the position of the minute hand of a secondary clock in a synchronous system hourly, and for correction of the position of the hour hand at less frequent intervals, upon receipt of proper commands from a remote master clock.

The various elements assembled along the central clock shafts between gears 54 and 156 comprise two separate incremental torque transmission subassemblies, which will be described in detail below.

Power is transmitted from motor pinion 35 through gear 36, through other suitable non-illustrated gearing means to minute gear 51, in order to drive the minute and hour hands. Bearing on one surface of minute gear 51 is a bowed leaf spring clutch 53, which is rigidly attached to minute shaft 52, to which minute hand 23 is also rigidly attached. Also rigidly attached to shaft 52 is minute correction driven gear 54, which meshes with minute correction drive gear 60, the latter being rigidly attached to a correction shaft 240.

The hour gear 61 meshes with an hour gear drive pinion 60a, which is also mounted on correction shaft 240. Hour gear 61 comprises a portion of a clutch assembly 206 through which power is transmitted to the hour hand 22 by means of hour sleeve 55 concentrically surrounding minute shaft 52.

Movement of Correction Rack 65

Also to be seen in FIGURE 1 is a portion of the mechanism to periodically correct the positions of the minute and hour hands. As is more particularly set forth in Black Patent No. 2,860,481, rack 65 is mounted for sliding movement in its own plane in the direction shown by the double arrow 65a, and for pivotal movement about gear 91. Momentary energization of electromagnet 80 pivots the slideably mounted rack 65 to the left. This engages rack teeth 68 with constantly rotating gear 69, which drives rack 65 upwards in the direction shown by the double arrows 65a. A rack guide 82 is positioned adjacent the rack for cooperation with a rack tab 83 protruding from the rack. When the rack 65 is first engaged by gear 69, tab 83 is positioned to the left of guide 82. As rack 65 is driven upward, tab 83 slides up the far or left side of guide 82 and retains rack 65 in engagement with gear 69 even though electromagnet 80 is de-energized. Rack 65 is thus continuously urged upward until tab 83 clears the top of guide 82, at which time rack-disengaging spring 86 is resiliently deformed to the left by a stud 224 protruding from the rack 65, and spring 86 therefore urges the rack 65 to the right, out of engagement with gear 69. Rack return spring 88 then urges rack 65 downwardly, returning rack 65 to its original lower or inactive position. The abrupt and forceful downward return movement of the rack 65 under the urging of rack return spring 88 often jars or shakes the clock mechanism, and this has produced shifting of the hour hand, causing inaccurate readings of such clocks.

Minute Hand Correction Mechanism

While rack 65 is being driven upward by gear 69, teeth 90 on rack 65 engage and rotate a rack-driven gear 91 through one-half turn. The rack-driven gear 91 is rotatably mounted on the shaft 240, and is rigidly fixed to a minute correction disc 97, which carries a minute correction pawl 93. Pawl 93 rides around the outer surface of a double-notched minute correction cam 94, the latter being rigidly mounted on shaft 240.

If the clock mechanism is "on time" and synchronized with the remote master clock, the notches 94a in the periphery of the disc shaped cam 94 will be so positioned that pawl 93 will not engage either of them until the end of its correction-movement, corresponding to the topmost position of rack 65.

If the clock is out of synchronism, however, the notched cam 94 will be in another angular position when correction occurs. When one of the two cam notches 94a is encountered by the pawl 93, the cam 94 is then forcibly carried by the pawl 93 through the remainder of the half-turn movement of pawl 93. Thus, rotation of gear 91 by elevation of the rack causes positioning of minute correction cam 94 to one of two equivalent predetermined angular positions spaced apart by 180 degrees and since the gear ratio between gear 60 and gear 54 is 2:1, this results in positioning of the minute hand 23 in the same predetermined angular position, the fifty-seven minute position, for example, whenever cam 94 is positioned by rack 65. Likewise, due to the 1:12 gear ratio between drive pinion 60a and hour gear 61, hour gear 61 is positively positioned in one of twelve predetermined angular positions by the operation of the correction rack assembly. During the forcible positioning of hour gear 61 by the correction rack assembly, since shaft 52 is geared to hour gear 61 and therefore rotated during the correction, the bowed spring clutch 53 slips on the surface of constantly rotating gear 51, allowing the position correction of the clock hands to overide the normal drive system of the clock.

Hour Hand Correction Mechanism

Also shown in FIGURE 1 is the assembly for correction of the position of hour hand 22. A correction arm 152 is pivotally mounted on rack 65 at point 152a and is provided at its upper end with an abutment 152b. When the rack 65 is being elevated by gear 69, a second properly timed energization of the electromagnet pivots arm 152 clockwise about pivot 152a. Arranged in the path of movement of abutment 152b when arm 152 has been pivoted by electromagnet 80 is a pin 175 which is coupled to an hour correction lever 170 through a lost motion connection. To provide the lost motion, the pin 175 is received in an oversized hole 176 in the correction lever 170, and is mounted at the end of an auxiliary link 177 which is pivoted to the hour correction lever 170 at a pivot 178. Correction lever 170 is pivoted at pivot 172 and has a pawl- and disc-engaging tab 171 fitting into a peripheral notch 160a in a pawl disc 160 and normally acting to urge a pawl 162 out of engagement with a ratchet wheel 157.

The ratchet 157 is mounted for rotatable movement about hour sleeve 55 and is continuously driven by motor pinion 35 through a gear train including gears 155 and 156. Also rotatably mounted on hour sleeve 55 is the twelve-hour ratchet pawl disc 160. Ratchet pawl 162 and correction pawl 163 are pivotally mounted on opposite sides of the disc 160, and are inwardly biased by means of springs 164 and 165 respectively. Tab 171 of the spring-urged correction lever 170 normally acts to block rotation of pawl disc 160, and simultaneously maintains pawl 162 out of engagement with the constantly rotating ratchet 157 until the hour hand correction mechanism is actuated. Pawl 163 normally rides idly on the periphery of an hour-hand correction cam 161 which is rigidly fixed on hour shaft or sleeve 55.

Accordingly, when a second properly timed energization of electromagnet 80 pivotally operates correction arm 152, this causes correction lever 170 to rotate counterclockwise about its pivot 172, thus withdrawing tab 171 from the step 160a on disc 160 and releasing ratchet pawl 162. Ratchet pawl 162 immediately engages the rotating ratchet 157, thus carrying disc 160 for one revolution around shaft 55 at the same accelerated speed (1 r.p.m.) as is maintained by ratchet 157. Near the completion of one revolution of disc 160, rack 65 is returned to its inoperative position as described above. This lowers arm 152, freeing lever 170, which then pivots forward about pivot 172. Tab 171 on lever 170 rides on the outer surface of disc 160 until it drops into the step 160a on disc 160, at which time tab 171 disengages pawl 162 from ratchet 157. Accordingly disc 160 is rotated through exactly one revolution each time the position of hour hand 22 is corrected. During the rotation of disc 160, pawl 163 rides around the periphery of cam 161 until it arrives at the indented step 166 on the cam 161. If the hour hand 22 with the hour shaft 55 and step 166 in cam 161 are already in the correct angular position, pawl 163 overtakes step 166 only at the end of the single revolution of disc 160, and accordingly does not affect the movement of cam 161. If hour hand 22 and correspondingly shaft 55 is at any other position at the correction time, due to power failure or jarring, for example, then correction pawl 163 will engage step 166 at some point in the 360° movement of disc 160 and forcibly rotate cam 161 at the speed of disc 160 for the remainder of the single rotation of disc 160. Since correction cam 161 is rigidly mounted on hour sleeve 55 to which friction disc 204 is rigidly mounted, this also rotates disc 204 at the speed of disc 160, until disc 160 and pawl 162 are once more disengaged by the tab 171 on the now-released correction lever 170. Thus if the hour hand 22 is out of position at the correction time, pawl 163 will engage the step 166 of cam 161 and forcibly carry cam 161, sleeve 55 and hour hand 22 to the predetermined angular position.

The Dimpled Clutch Assembly

Friction disc 204 is a portion of a novel friction clutch 206 which is provided to permit the necessary slippage between the hour shaft 55 and the hour gear 61 during the foregoing "correction" operation. The clutch is so arranged and constructed that hour shaft 55 carrying hour hand 22 may assume only a limited number of predetermined angular positions with respect to the hour gear. Clutch assembly 206 is shown in an exploded view in FIGURE 2 and in cross section in FIGURE 3. Clutch assembly 206 generally comprises the hour gear 61, dimpled disc 204, and bushing 202.

Hour gear 61 is rotatably mounted on shoulder 200 of bushing 202 (FIGURE 2). Disc 204 is keyed onto non-circular shoulder 208 on bushing 202 by its mating hole 210, with disc 204 abutting the enlarged underlying shoulder 212 on bushing 202. Disc 204 has formed thereon indicia or more specifically a pair of diametrically opposed dimples 218, and is formed of stiff resilient sheet material, e.g. Phosphor bronze.

Preferably disc 204 is preformed into a dished shape as shown in FIGURE 4 in order to insure that the dimples 218 are urged into mating indicia or holes 220 in gear 61 upon assembly. Disc 204 is assembled on shoulder 208 with the dimples 218 facing away from shoulder 212. Hour gear 61 is retained on shoulder 200 by washer 214, which is peened on shoulder 216, and is resiliently urged against washer 214 by the dished resilient disc 204. Gear 61 has twelve holes 220 equally spaced around the surface facing disc 204, positioned for mating engagement with dimples 218. Bushing 202 is force fitted onto knurled portion 222 of hour hand shaft 55. Since hour hand 22 is likewise keyed onto shaft 55, hour hand 22 is positively positioned with respect to dimples 218.

The Hour Hand Correction Operation

Due to the geared connection including gears 60 and 60a, each complete revolution of gear 54 drives hour gear 61 through a thirty degree (30°) angle. Gear 61 has its twelve recesses or apertures 220 evenly spaced thirty degrees (30°) apart on the surface adjacent disc 204, one for each hour. Therefore, each time minute hand 23 is corrected and gear 54 on minute shaft is returned to the same position as explained above, the holes 220 will be accurately positioned by the gear train at one of twelve equivalent predetermined angular reference positions, for example, one of the pairs of holes on a diameter of gear 61 may always be vertically aligned each time the minute hand 23 is corrected. During the correction period, the minute hand and consequently hour gear 61 is positioned as indicated above. At times when the hour correction is also made, shortly after the hour gear 61 is positioned by this minute correction the hour hand 22 and disc 204 are returned to the proper reference position, with dimples 218 camming in and out of successive holes 220. Although hour gear 61 rotates while correction of the hour hand 22 and disc 204 takes place, rotation of the hour gear 61 is so slow that dimples 218 enter the correct pair of holes 220.

The dimpled clutch assembly 206 provides sufficient interlocking between the dimples 218 and the corresponding holes 220 in hour gear 61 to prevent "drifting" of the hour hand 22 due to the shock caused by the hourly correction of the minute hands 23, and yet permits slippage between disc 204 and gear 61 during the less frequent correction of the hour hand. A particular embodiment of the dimpled clutch assembly requires about 4.5 to 6 inch-ounces of torque before dimples 218 cam out of the holes 220 in which they are positioned.

Accordingly it may be seen that there has been provided a clutch assembly which will not slip below a particular torque threshold. Dimples 218 on the flexible disc 204 and the mating holes 220 in the surface of gear 61 constitute indexing means to maintain discrete angular relationships between the friction disc and the hour gear, the twelve equally spaced holes 220 in the face of hour gear 61 providing indexing at hourly intervals. The clutch assembly 206 is simple and economical to manufacture, yet has proved to be entirely reliable in operation.

It will thus be seen that the objects set forth above, among those made apparent from the preceding description are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. In a secondary clock having means responsive to a first control signal then a second control signal and adapted for periodic correction by apparatus including, a first and a second automatically instituted correction means, a synchronous motor driving a minute shaft through a first clutch, a first gear rigidly mounted on said minute shaft, a reduction gear assembly including said first gear, a second shaft parallel to said minute shaft, and a second gear rotatably mounted on an hour sleeve which is concentric with said minute shaft; the improvement comprising in combination:

said second gear having formed in at least one planar face thereof a first plurality of indicia equally spaced from each other and at the same radius from the axis of said hour sleeve, a clutch plate rigidly mounted on said hour sleeve and having formed thereon a second plurality of indicia mating with said first plurality of indicia, means resiliently urging said clutch plate and said second gear together at their mating positions whereby said clutch plate and said second gear constitute a second clutch having a predetermined torque threshold, said first control signal enabling said first automatically instituted correction means to forcibly override said first clutch and position said minute shaft to a predetermined angular position, and said second control signal following said first control signal enabling said second automatically instituted correction means to forcibly override said second clutch and position said hour sleeve to a predetermined angular position when said second correction means exerts a torque greater than the torque threshold of said second clutch.

2. The combination defined in claim 1 wherein:

said first automatically instituted correction means includes a reciprocal member, and said torque threshold of said second clutch is higher than the transient torque produced by the operation of said reciprocal member.

3. The combination defined in claim 2 wherein:

said first plurality of indicia are constituted by twelve recesses in said second gear, said recesses being equally spaced from each other and positioned at a constant radius from the axis of said hour sleeve, and said clutch plate being formed of semi-rigid resilient material and having two protuberances constituting said second plurality of indicia mating with and positioned in a diametrically opposed pair of said recesses.

4. In a secondary clock energized from an A.C. supply the combination comprising:

an hour shaft, a bushing fast on said hour shaft, a non-circular shoulder on said bushing, a clutch plate having a non-circular opening therein and indexing means formed thereon rigidly mounted on said bushing by means including said non-circular shoulder, an hour gear mounted for free rotation on said hour shaft engaging said clutch plate, a plurality of mating index means in said hour gear, said hour gear and clutch plate being resiliently urged into coupling engagement via said clutch plate indexing means, said hour gear being connected by a gear train including a further shaft to a minute gear, a minute shaft disposed within said hour shaft, said minute gear being rigidly mounted on said minute shaft, a first automatically instituted correction means to position said minute shaft at a predetermined angular position, and a second automatically instituted correction means operable following operation of said first correction means to enable escapement of said clutch plate whereby the said indexing means thereon is capable of resiliently stepping out of and into said mating index means in said hour gear for resolving said hour shaft at a predetermined angular position.

References Cited in the file of this patent

UNITED STATES PATENTS

| | | |
|---|---|---|
| 388,404 | Fischer | Aug. 28, 1888 |
| 2,456,122 | Guilden | Dec. 14, 1948 |
| 2,564,103 | Gallagher | Aug. 14, 1951 |
| 2,716,875 | Hill et al. | Sept. 6, 1955 |
| 2,860,481 | Black | Nov. 18, 1958 |

FOREIGN PATENTS

| | | |
|---|---|---|
| 617,298 | Canada | Mar. 28, 1961 |